Oct. 12, 1943.    J. E. WALKER    2,331,641
SHAFT SEALING MEANS FOR PUMPS
Filed Jan. 21, 1941
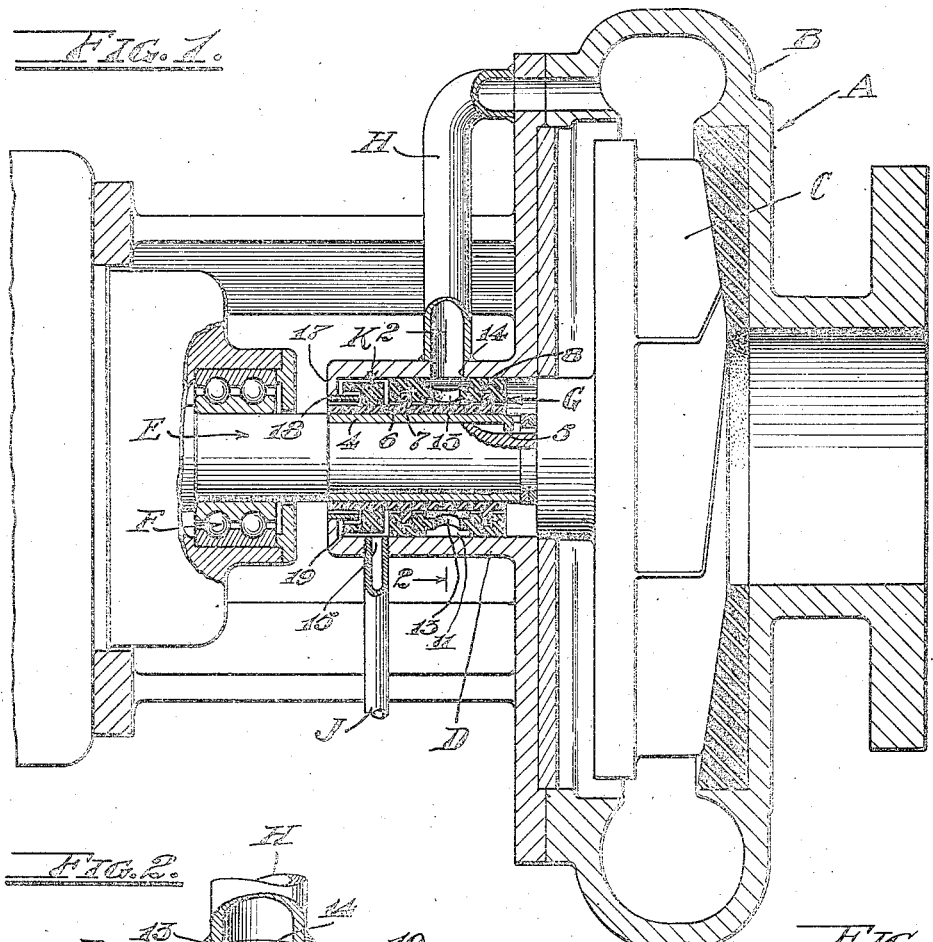
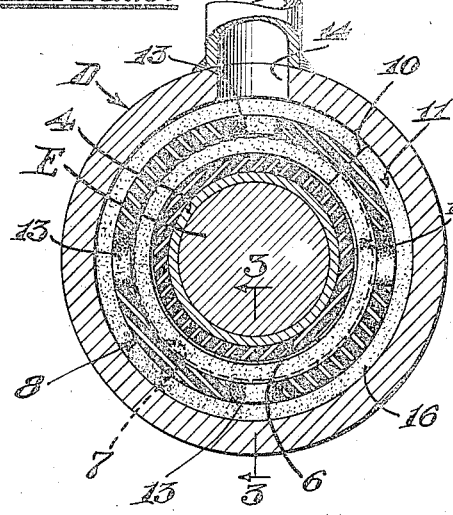
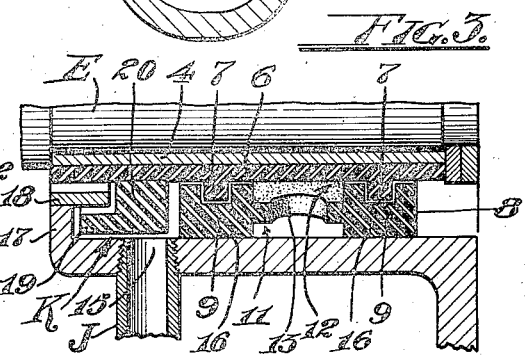
Inventor
Jack E. Walker
By R. S. Berry
Attorney Patented Oct. 12, 1943

2,331,641

UNITED STATES PATENT OFFICE 2,331,641

SHAFT SEALING MEANS FOR PUMPS

Jack E. Walker, Los Angeles, Calif.

Application January 21, 1941, Serial No. 375,232

6 Claims. (Cl. 286—9)

This invention has for its primary object to provide a new and highly efficient means for sealing the shaft of a suction lift centrifugal pump as employed for pumping muddy, dirty or sandy fluids or any fluid containing abrasive substances, wherein the pump supplies such fluid to the sealing means to therewith form and maintain without objectionable wear on the sealing means and associated parts, a reliable liquid seal around the shaft where it enters the pump housing.

In pumping liquids containing abrasives, such, for example, as the "mud" compositions used in drilling wells, a great deal of difficulty is experienced in maintaining an air tight seal and operative condition where the shaft enters the pump and the pump, due to the action of the abrasive components such as sand, dirt, etc., which are picked by and held in suspension in said composition. Consequently pump failures and frequent shut-downs and replacement of parts are brought about, especially where a centrifugal suction lift pump is employed to pump the sanded fluid from a sump therefor into desanding apparatus. I have found that by lining certain of the fluid exposed parts of the pump with a compressible, resilient material such as synthetic rubber, or the like, and more particularly those parts of the housing and shaft where the latter enters the housing, all objectionable and damaging abrasive action and wear is eliminated and I am therefore able to conveniently use the abrasive containing liquid from the pump, together with a synthetic rubber sealing means of special design for forming and maintaining an effective liquid seal to prevent air from entering the pump around the shaft and thereby sealing the shaft.

In consideration of the foregoing facts, it is an important object of my invention to provide a simple and inexpensive synthetic rubber sealing unit for a pump shaft such as described, wherein said unit may be quickly and easily assembled on the shaft and pump and comprises a fixed part and a rotary part which form an annular fluid chamber into and through which liquid is passed from the pump chamber so as to form and maintain an annular liquid seal around the shaft, said parts being closely spaced so that they do not contact as bearing elements and due to this spacing and the yieldability and resiliency thereof the abrasive particles and solids in the fluid will pass freely therebetween without setting up undue friction and causing appreciable wear thereof.

With the foregoing objects in view, together with such other objects and advantages as may subsequently appear, the invention is carried into effect as illustrated by way of example in the accompanying drawing in which:

Fig. 1 is a vertical sectional view of a pump sealing means embodying my invention and as when installed in a suction lift centrifugal pump;

Fig. 2 is an enlarged sectional view taken on the line 2—2 of Fig. 1;

Fig. 3 is an enlarged sectional view taken on the line 3—3 of Fig. 2.

Referring to the drawing more specifically, A designates a suction lift centrifugal pump including a housing B, an impeller C, a hub D, a shaft E, a bearing F, and the sealing means G embodying my invention. This sealing means is designed to maintain a liquid seal between the shaft and the hub to prevent air from entering the pump housing and is supplied with sealing fluid from the pump by means of a pipe H and discharges fluid through pipe J back to the intake side of the pump or otherwise as desired.

The sealing means G as here shown comprises a metal sleeve 4 keyed as at 5 on the shaft E within the hub D and having vulcanized thereon a deformable and resilient jacket or tubular covering 6 of synthetic rubber or the like. On this jacket are axially spaced circumferential ribs or flanges 7 of the same material as and preferably formed integral with the jacket.

A non-rotating tubular or annular bushing or collar 8 of deformable, resilient synthetic rubber or the like is forced into the hub D over the jacket 6 and fits snugly against and forms a tight seal along the inner surface of the hub D with its inner surfaces slightly circumferentially spaced from the jacket 6 and ribs 7.

Adjacent its ends the bushing 8 is provided interiorly with annular grooves 9 into which the ribs 7 extend, it being noted that the bushing is split as at 10 to provide for fitting it over the parts 6 and 7. The ribs 7 are also slightly spaced from the walls of the grooves 9 to permit of free passage of the sealing fluid therebetween.

Centrally of its ends the bushing 8 is formed with wide external and internal circumferential grooves 11 and 12 which are communicated with one another by means of openings 13 in the bushing. The external groove 11 registers with an inlet opening 14 in the upper side of hub D. An outlet opening 15 in the hub D at a point spaced from the outer end of the bushing 8 communicates with the pipe J for discharging fluid from the sealing means G. Pipe H is connected with an outlet opening 16 in the pump housing B and conducts fluid into the groove 11 where it enters groove 12 through openings 13 and thereby forms an annular liquid seal for the shaft.

It should be noted that the groove 11 forms on the interior of the bushing 8 two annular ribs 16 which have a close and sealing fit with the hub D so that the bushing is thereby held against rotation, the split of the bushing being closed by this pressure fit.

The outer end of the bushing 8 is well inwardly spaced from flange 17 on the outer end of the hub D, so as to form an annular chamber K with which the discharge opening 15 registers. It is noted that the sleeve 4 and jacket 6 are substantially equal in length to the hub D and that the outer ends of said sleeve and jacket are substantially flush with the outer face of the end flange 17 while said jacket is spaced circumferentially from said flange.

A labyrinth is formed in chamber K by means of a short section of tubing or sleeve 18 fitted into the outer end of the housing D in frictional contact with the flange 17 and an overlying sleeve 19 of synthetic rubber extending laterally from a synthetic rubber ring 20 forced on the jacket 6 in close and sealing engagement therewith. These labyrinth forming sleeves lie in opposed circumferential spaced relation to one another and the hub and jacket 6 so as to form therebetween a tortuous passage or labyrinth.

It is now seen that chamber K will be supplied with sealing fluid from the internal groove 12 through the tortuous passage afforded between the jacket 6 and bushing 8; and that all of the spaces between the jacket 6 and the bushing 8, and the chamber K will be filled with fluid whereby to form and maintain an effective liquid seal.

As the fluid is forced under pressure from the pump to the sealing means through pipe H and the inlet opening 14 is larger than the outlet opening 15, it is apparent that the fluid will fill the sealing means as aforesaid whereby to maintain the desired liquid seal around the shaft to prevent the intaking of atmospheric air into the pump housing.

Any sand or grit or other abrasive or solid substance in the fluid which forms the liquid seal will pass between the closely spaced synthetic rubber parts of the elements 6, 7 and 8 which parts will yield to permit of such passage of abrasive therebetween without causing objectionable friction or appreciable wear on the sealing members, or any appreciable wear between the associated parts of the shaft and hub.

I have found that in spite of a large sand or abrasive content in the fluid which seals the shaft, there will be provided a reliable seal without any damage to the pump, shaft and parts of the sealing means.

The labyrinth members 18 and 19 make possible the effective retention of the liquid in chamber K while at the same time providing for spacing the rotating jacket 6 on the shaft D from the flange 17 whereby to eliminate friction and wear. Any small amount of fluid leaking out past flange 17 will not ill effect the liquid seal nor cause the adjacent bearing F to be damaged, since such small amount will not be sufficient to flow along the shaft into the bearing.

It will now be seen that my invention may be said to include the provision of a means for utilizing the liquid being pumped for maintaining an air-tight liquid seal around the shaft where it enters the pump housing, in which said means primarily comprises soft rubber or soft synthetic rubber or rubber-like members covering the opposed portions of the shaft and housing and constructed and arranged to define an annular liquid chamber for sealing liquid delivered thereto automatically by and during operation of the pump. By closely spacing these rubber or rubber-like members an effective seal is insured and where the liquid contains sand and other abrasives in suspension, the rubbery members will yield and allow passage of the sand or abrasive between the members without appreciable friction and wear.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a pump including a housing having a hub, and a rotary shaft extending through said hub; a rotary deformable and resilient jacket surrounding and fixed to the portion of the shaft extending through said hub, a stationary tubular bushing of deformable resilient material fitted in and having sealing contact with the interior of said hub and surrounding said jacket in closely spaced relation thereto to define an annular liquid passage therebetween, said bushing being spaced inwardly from the outer end of said hub to define an annular chamber between the jacket and hub, said bushing having an opening therein for the entrance of liquid into the spaces between it and the jacket, said hub having an intake opening registering with the opening in the bushing and an outlet opening registering with said annular chamber, means for conducting liquid from the pump through said intake opening; said annular passage opening into said annular chamber, and closely spaced sealing members carried by the hub and jacket respectively at the outer end of the jacket for forming a labyrinth for resisting the discharge of fluid from the outer end of said hub.

2. In a pump including a housing having a hub, and a rotary shaft extending through the hub; a rotary deformable resilient jacket fixed on and covering the portion of the shaft within said hub, a stationary tubular bushing of deformable resilient material in sealing contact with the interior of said hub and surrounding said jacket in closely spaced relation thereto whereby to define annular passages for liquid for sealing the spaces between the jacket and bushing, said bushing having an opening therethrough to allow the entrance of liquid into the space between the bushing and the jacket, means for conducting liquid from the pump into said opening in the bushing, means for discharging liquid from said hub after it has passed through the spaces between the bushing and jacket, opposed spaced members carried by the jacket and hub respectively at the outer end of the latter for forming a labyrinth for resisting the discharge of sealing liquid through the outer end of said hub, said bushing having internal and external circumferential liquid receiving grooves which are communicated by means of the opening in the bushing.

3. In a pump including a housing having a hub, and a rotary shaft extending through the hub; a rotary deformable resilient jacket fixed on and covering the portion of the shaft within said hub, a stationary tubular bushing of deformable resilient material in sealing contact with the interior of said hub and surrounding said jacket in closely spaced relation thereto whereby to define annular passages for liquid for sealing the spaces between the jacket and bushing, said bushing having an opening therethrough for the entrance of liquid into the space between the bushing and the jacket, means for conducting liquid from the pump into said opening in the bushing, means for discharging liquid from said hub after it has passed through the spaces between the bushing and jacket, and opposed spaced members carried by the jacket and hub respectively at the outer end of the latter for forming a labyrinth for resisting the discharge of sealing liquid through the outer end of said hub, said bushing having internal and external circumferential liquid receiving grooves which are communicated by means of the opening in the bushing, and annular ribs on said jacket on opposite sides of the internal groove in said bushing, said bushing having other internal grooves receiving said ribs so as to define liquid passages around the ribs.

4. In a pump including a housing having a hub, and a rotary shaft extending through said hub; a rotary deformable and resilient jacket surrounding and fixed to the portion of the shaft extending through said hub, a stationary tubular bushing of deformable resilient material fitted in and having sealing contact with the interior of said hub and surrounding said jacket in closely spaced relation thereto to define an annular liquid passage therebetween, said bushing being spaced inwardly from the outer end of said hub to define an annular chamber between the jacket and hub, said bushing having an opening therein for the entrance of liquid into the spaces between it and the jacket, said hub having an intake opening registering with the opening in said bushing and an outlet opening registering with said annular chamber, means for conducting liquid from the pump into said intake opening; said annular passage opening into said annular chamber, and closely spaced sealing members carried by the hub and jacket respectively at the outer end of the jacket for forming a labyrinth for resisting the discharge of fluid from the outer end of said hub, said bushing having internal and external circumferential grooves communicated through the opening therein.

5. In a pump including a housing having a hub, and a rotary shaft extending through said hub; a rotary deformable and resilient jacket surrounding and fixed to the portion of the shaft extending through said hub, a stationary tubular bushing of deformable resilient material fitted in and having sealing contact with the interior of said hub and surrounding said jacket in closely spaced relation thereto to define an annular liquid passage therebetween, said bushing being spaced inwardly from the outer end of said hub to define an annular chamber between the jacket and hub, said bushing having an opening therein for the entrance of liquid into the spaces between it and the jacket, said hub having an intake opening registering with the opening in said bushing and an outlet opening registering with said annular chamber, means for conducting liquid from the pump through said intake opening; said annular passage opening into said annular chamber, and closely spaced sealing members carried by the hub and jacket respectively in said chamber, for forming a labyrinth for resisting the discharge of fluid from the outer end of said hub, said bushing having internal and external circumferential grooves communicated through the opening therein, and circumferential ribs on said jacket between which is disposed the internally grooved portion of the bushing, said bushing having grooves in which said ribs extend so as to define liquid passages around the ribs communicating the internal groove with said annular chamber.

6. In a shaft seal, a housing, a rotary shaft extending into the housing, a sleeve keyed to said shaft, a jacket of deformable elastic and rubber-like material fixed to and surrounding said sleeve, a tubular bushing of deformable resilient material surrounding said jacket and sleeve and having a sealing contact with said housing and provided with an internal groove forming an annular liquid chamber between it and the jacket, said jacket and bushing being otherwise disposed in such closely spaced relation circumferentially as to retard flow of and thereby retain liquid therebetween yet yield to passage therebetween of solid particles which may be suspended in the sealing liquid, and means providing for the introduction of liquid into said chamber and its discharge therefrom.

JACK E. WALKER.